United States Patent
Doytchinov et al.

(10) Patent No.: US 8,447,549 B2
(45) Date of Patent: May 21, 2013

(54) TOLERANCE EVALUATION WITH REDUCED MEASURED POINTS

(75) Inventors: Kostadin Doytchinov, Ottawa (CA); Tibor Prókai, Budapest (HU); Dimitar Kirjakov, Budapest (HU)

(73) Assignee: Quality Vision International, Inc., Rochester, NY (US)

( * ) Notice: Subject to any disclaimer, the term of this patent is extended or adjusted under 35 U.S.C. 154(b) by 176 days.

(21) Appl. No.: 13/025,385

(22) Filed: Feb. 11, 2011

(65) Prior Publication Data

US 2012/0209553 A1 Aug. 16, 2012

(51) Int. Cl.
*G01N 37/00* (2006.01)
*G06F 19/00* (2011.01)

(52) U.S. Cl.
USPC ............................................ 702/81; 700/175

(58) Field of Classification Search
USPC ...... 702/81, 33, 84, 94–95, 97, 127, 150–153, 702/155–158, 189–191; 33/503, 700, 710; 700/109–110, 175
See application file for complete search history.

(56) References Cited

U.S. PATENT DOCUMENTS

| | | | |
|---|---|---|---|
| 5,425,066 A | 6/1995 | Takahashi et al. | |
| 6,665,080 B1 | 12/2003 | Haertig et al. | |
| 7,400,992 B2 * | 7/2008 | Doytchinov | 702/95 |
| 7,420,555 B1 * | 9/2008 | Lee | 345/424 |
| 2007/0282550 A1 * | 12/2007 | Doytchinov | 702/84 |
| 2008/0249731 A1 | 10/2008 | Doytchinov | |

FOREIGN PATENT DOCUMENTS

| | | |
|---|---|---|
| KR | 10-0288330 B1 | 2/2002 |
| KR | 10-0911506 B1 | 8/2009 |
| KR | 10-2010-0092058 A | 8/2010 |
| KR | 10-2010-0109216 A | 10/2010 |

OTHER PUBLICATIONS

Aljahdali et al.: "Improving data reduction for 3D shape preserving" Journal of Computational Methods in Sciences and Engineering 9 (2009) S35-S51.
Chan: "A Minimalist's Implementation of the 3-d Divide-and-Conquer Convex Hull Algorithm" (Jun. 4, 2003), Waterloo, Ontario, Canada (12 pages).
Lee, et al.: "Data Reduction Methods for Reverse Engineering" International Journal of Advanced Manufacturing Technology (2001) 17:735-743.
Lopez et al.: "Hausdorff Approximation of 3D Convex Polytopes" pp. 1-10, Denver, Co & Haifa, Israel, 2008.
Martin et al.: "RECCAD, Deliverable Document 1 Copernicus project, No. 1068" (1996).

(Continued)

*Primary Examiner* — Toan Le
(74) *Attorney, Agent, or Firm* — Stephen B. Salai, Esq.; Thomas B. Ryan; Harter Secrest & Emery LLP

(57) ABSTRACT

A method of determining whether a part satisfies tolerance criteria includes making a multiplicity of measurements of the part, reducing the number of measured points to a number of boundary points that define a boundary within which all measured points are encompassed and comparing the boundary to a tolerance limit of a normal surface to determine whether the part conforms to the tolerance.

16 Claims, 3 Drawing Sheets

OTHER PUBLICATIONS

Wang et al.: "Lidar Data Segmentation and Classification based on Octree Structure" Department of Geomatics, National Cheng Kung University, Taiwan, R.O.C. (6 pages).

PCT—Notification of Transmittal of the International Search Report and the Written Opinion of the International Searching Authority, or the Declaration; dated Nov. 30, 2012 in corresponding PCT International Application No. PCT/US2012/024686 (2 pages).

PCT—International Search Report dated Nov. 30, 2012 in corresponding PCT International Application No. PCT/US2012/024686 (3 pages).

PCT—Written Opinion of the International Searching Authority dated Nov. 30, 2012 in corresponding PCT International Application No. PCT/US2012/024686 (3 pages).

* cited by examiner

TOLERANCE EVALUATION WITH REDUCED MEASURED POINTS

FIELD OF THE INVENTION

The present invention relates to metrology. More specifically, the invention relates to metrology processes that allow for a reduced number of measured data points while preserving original information required for determining conformance of a part with an established tolerance.

BACKGROUND OF THE INVENTION

Laser scanning, computed tomography and other non-contact measurement technologies have been increasingly used to measure manufactured parts. Through recent developments, these three-dimensional measuring technologies have become more accurate and the speed of data acquisition has increased dramatically. In fact, some sensors are capable of producing more than 200,000 measured points per second. This high performance and fast processing speed provide a large amount of information about the surface being measured, but they also cause a major problem for handling these increasingly large data clouds. That is, it tends to be difficult to extract accurate and useful information within a reasonable amount of time from the large amount of data.

Fundamentally, there are two major reasons for obtaining information about the part. The first reason is known as reverse engineering, in which information is collected about an unknown geometry and a CAD model representing the parts is then created. The second reason for obtaining this information is to verify tolerance compliance. That is, when a desired geometry is known, such as in the form of a drawing or a CAD model, it is desirable to obtain measurements of a manufactured part to prove that the part conforms to a specified tolerance zone as established by the known desired geometry. These two uses of the measurement information require very different approaches during data reduction processes. In the first use, the final goal of the information is to produce a smooth mathematical surface that simulates the part. This creation of the mathematical surface requires averaging of the data points. In contrast, the second use, that is, for verification of tolerance compliance, requires that the measured data points be fitted or oriented to the nominal geometry and compared to its tolerance zone. In the second use, averaging cannot be used because it is important to know about the actual surface of the part for compliance, not a smooth rendering of that surface.

Many methods for data reduction are conventionally known, but all are based on some sort of averaging technique. For example, known techniques include arithmetical average, median, and geometrical average. However these averaging techniques are not able to preserve the surface information adequately for a comparison to a tolerance zone.

In one conventional example, an original data cloud is reduced by dividing it into grids, either two dimensional or three dimensional, and by sampling a representative point from each grid. This representative point may be the center of gravity, the simple average, the median point, or something else. The grids in these conventional methods may be uniform or non-uniform. In another known technique, data is tessellated into triangular planes. When one triangle substitutes multiple points, data reduction is achieved. The size of the triangle is based on a given threshold for the residual deviations (error) of the points to which the triangular plane is best fit. If the error exceeds the threshold, the triangle is subdivided into smaller triangles until the threshold is met. Another technique is to fit mathematical surfaces to the data cloud and the surfaces are later used to generate smaller numbers of substitution points. Yet another technique is shown in U.S. Pat. No. 7,420,555, which describes a method of mapping multiple points into regular cubes, called voxels, for the purpose of faster visualization. Each voxel is represented by its average point and all points mapped to the voxel have the same attributes. However, each of these techniques is an averaging technique.

While all of these mentioned techniques are suitable for the purpose of reverse engineering with the respective advantages and drawbacks, none of them is suitable for verification for tolerance compliance. In the case of tolerance compliance, the part is measured to make a yes/no decision as whether or not the feature is in tolerance. Using the conventional techniques described above, bad parts may be accepted because each of those techniques leads to underestimation of errors. By averaging substitution of points, the volume information of the original points is not being preserved and only the average information is being kept. When fitting data to a tolerance zone, it is the extreme points and not the average points that determine the result of the evaluation.

An analogy would be to use the least squares averaging method to calculate the sizes of a piston and a cylinder which have real form errors for the purposes of determining whether or not they are going to fit. The least squares averaging method may indicate that the piston will fit into the cylinder while in reality, due to the fact that the parts have form errors, e.g., cylindricity errors, they may not fit at all. The proper evaluation for the purpose of the fit would be to use maximum inscribed cylinder for the cylinder and minimum circumscribed cylinder for the piston.

Thus, there is a need in the art for a data reduction method in which the result of a comparison to a tolerance zone with the full data set and with a reduced data set produces the same conclusion as to whether the part is in or out of tolerance.

SUMMARY OF THE INVENTION

The present invention remedies the foregoing needs in the art by providing a method for determining tolerance compliance for a part.

In one aspect of the invention, a method of determining whether a part satisfies the tolerance criteria includes making a multiplicity of measurements of the part, reducing the number of measured points to a number of boundary points that define a boundary within which all measured points are encompassed and comparing the boundary to tolerance limits of a normal surface to determine whether or not the part conforms to the tolerance.

In another aspect of the invention, the boundary is the convex hull of the boundary points.

In yet another aspect, the measured points are separated into measured point subsets and boundary points are determined for each measured point subset. A three-dimensional shape, which encompasses all measured points in the measured point subset, may then be fit to each of the measured point subsets.

These and other aspects, features, and benefits of the invention may be had with reference to the following disclosure and accompanying figures, in which embodiments of the invention are described and shown.

BRIEF DESCRIPTION OF THE DRAWING FIGURES

DETAILED DESCRIPTION OF THE INVENTION

Figure 1:
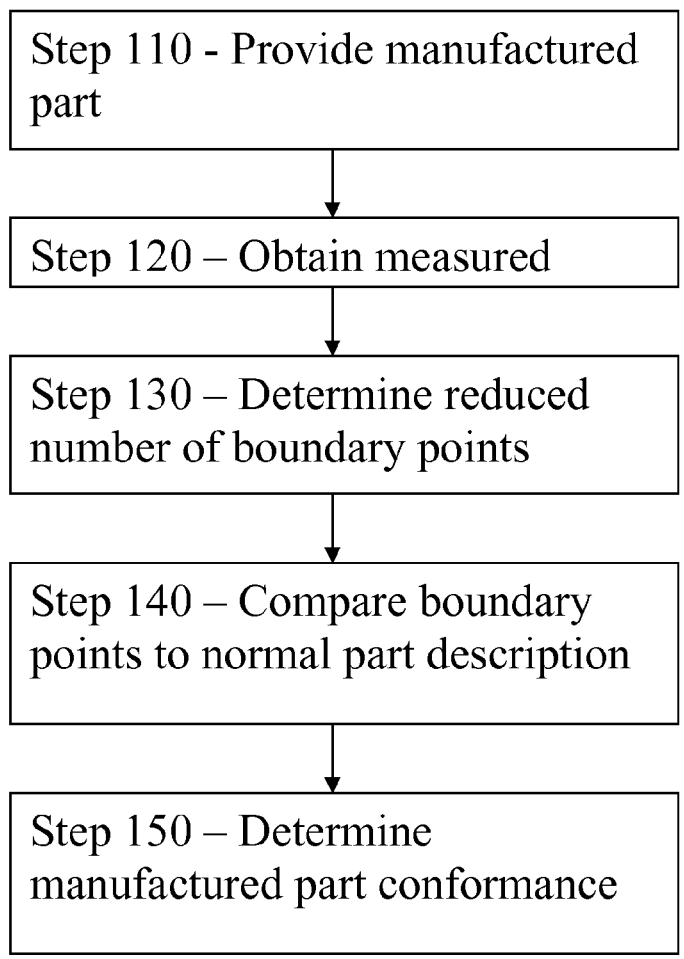
FIG. 1 is a flowchart of a process according to a first embodiment of the invention.

The present invention relates to a method for evaluating tolerance of a manufactured part. More specifically, the method reduces a number of points in a data cloud while maintaining the important metrological information at these points to compare that information to a tolerance zone, and ultimately accept or reject the part. This method allows for a reduced data set but the evaluation outcome with the reduced data set being substantially the same as evaluation using the full data set.

The present invention recognizes that the outcome of the evaluation depends generally only on very few extreme points or covering two- or three-dimensional surfaces that are then compared to the tolerance zone. These points or covering surfaces generally are "extreme" in that they are farthest from nominal in the direction perpendicular to the tolerance zone. According to the present invention, a method is provided to determine these extreme points or surfaces and allow these points or equivalent substituting points to be used when searching for a conformity solution.

According to the present invention, data about a manufactured surface is obtained. In the embodiments discussed below, a data cloud containing all the measured points describing the manufactured surface is established using known measuring techniques. This data cloud contains X- and Y-coordinates in a two dimensional case, and X-, Y-, and Z-coordinates in a three-dimensional case. Each of these points may also have additional attributes such as measurement uncertainties, probe tip radius, normal vector, and others. The raw data may also be subjected to noise filtering and outlier removal before the data reduction procedure, according to known techniques for doing such filtering and outlier removal. Moreover, the data about the surface is not limited to point data, but instead may be surface data, for example, represented with a triangular mesh. Such a mesh may also contain topology information including neighbors and normals, for example.

The data cloud contains a large number of data points, and it is unnecessary, and in some instances impractical, to retain and/or evaluate all of these data points. The present invention establishes a significantly-reduced number of points, which accurately represents the entire data cloud for the purpose of the tolerance evaluation. In one example of the invention, subsets of the data cloud points are considered individually and for each subset, "boundary" points are determined. That is, points that are known to be the outer boundaries of the subset in consideration are identified and stored. Some of these boundary points are retained as a replacement for the entire subset, upon a determination that they completely define the subset being considered. The remaining points in the subset may be thereafter ignored, because the boundary points are an adequate representation of all points in the considered subset. Once all boundary points from each of the considered subsets are collected, these boundary points accurately define the measured surface, but are much fewer in number than the points actually measured.

A determination of whether the measured surface is in- or out-of-tolerance can be made more quickly by evaluating only the reduced data set, that is, the boundary points, or even a surface that covers the boundary points, than could be made by evaluating all measured points. This is especially true when the in-tolerance evaluation includes using an iterative process, such as when performing a best-fit analysis. Best-fit analyses are described in U.S. Pat. No. 7,400,992, the disclosure of which patent is hereby incorporated by reference. As in best-fit methods including ones described in the '992 patent, a collection of points that describes a measured surface is translated and/or rotated about available degrees of freedom to determine whether the points fit within the specified tolerance zone at different orientations of the measured-part reference frame. The '992 patent also considers uncertainties associated with each point when determining the best-fit.

FIG. 1 is a flowchart illustrating a process according to an embodiment of the invention. In Step 110, a manufactured part is provided. In Step 120, a plurality of measured points are obtained, using conventional measuring techniques/apparatus. In Step 130, the plurality of measured points is reduced to a number of boundary points. Preferably, the boundary points define the measured surface and none of the measured points is outside the surface defined by the boundary points. In Step 140, the boundary points are compared against a nominal description of the manufactured part, and in Step 150, a determination is made of whether the part is in- or out-of-tolerance.

The invention can be carried out in a number of methods and can take a number of configurations. In one embodiment, the boundary points are determined and used individually to determine conformity of the part being measured. In another, a surface is fit to the boundary points on each side of the normal surface. In yet another, boundary points of a number of volumes make up the boundary points and the collection of all volumes results in an accurate representation of the measured part.

Figure 2:
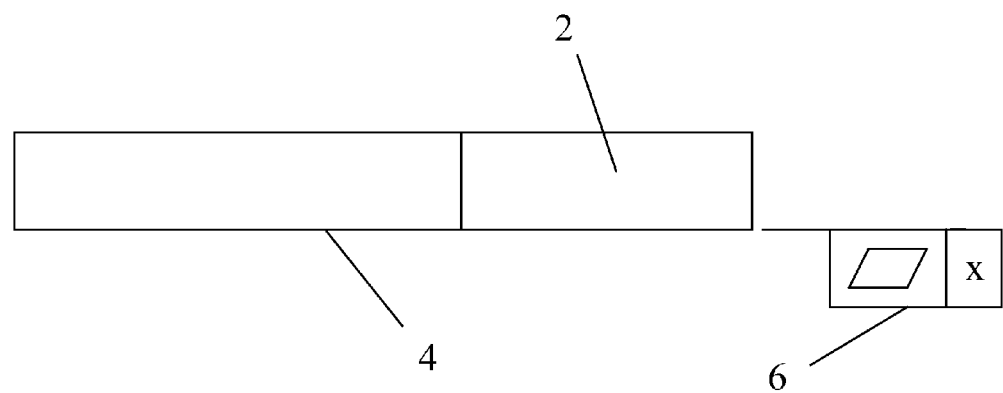
FIG. 2 is a representation of a designed part with associated tolerance limits.
Figure 2:
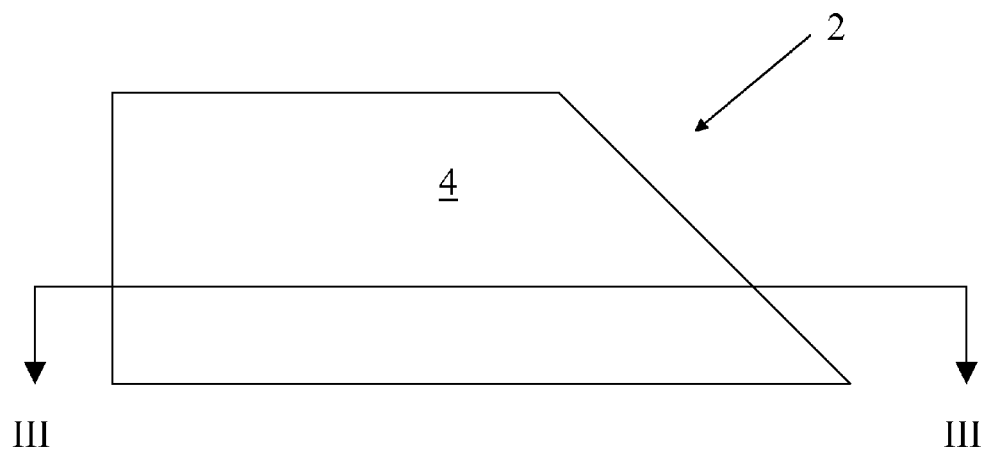

In practice, the invention is used to quickly and accurately determine whether a manufactured part is within a specified tolerance. For example, as shown in FIG. 2, a surface 4 of a manufactured part 2 arranged in the X-Y plane is to be measured to determine whether it corresponds to a tolerance 6 assigned to that surface. According to the designated drawing, the surface 4 is designed requiring a surface flatness within a certain tolerance. Ideally, the surface would be perfectly planar, but manufacturing processes are not perfect, so there is invariably some undulation or variance to the planarity of the surface. So long as this variance is within the allowable tolerance, the part will be acceptable.

Using conventional measuring techniques, for example, utilizing non-contact measuring apparatus, the surface 4 is measured and an extremely large number of data points is obtained very quickly, for example, up to about a million points per second. The large number of points obtained using non-contact apparatus is beneficial in that the data density is much higher than that obtained from contact-measurement techniques, but the information is so abundant that it is not possible to quickly identify whether the surface is within tolerance using conventional processing techniques, especially when complex analysis, such as best-fit analysis is conducted. Accordingly, the large number of points is reduced to a smaller subset of points using the invention.

In a first example of the invention, predetermined subsets of the numerous points are considered individually and for each subset the points that are farthest from the nominal surface are identified by measuring the distance between each point and the surface along a line normal to the surface through that point. These points are retained for further processing; all other points are temporarily disregarded. These points likely will be on both sides of the nominal surface, i.e., above and below the surface being measured in the example. These extreme points are the boundary points beyond which no point in the subset will lie and these points will accurately describe the surface being measured within the confines of that predetermined subset. Thus, for each subset of considered data points, a relatively small number of points, as few as one or two in some instances, are actually used to identify the surface. When each of these relatively small number of points are combined across the subsets, an accurate description of the measured surface is obtained, but with a minimized number of data points. This minimized number of data points is more readily processed to determine whether the part is within tolerance, but allows the determination to be just as accurate.

Figure 3:
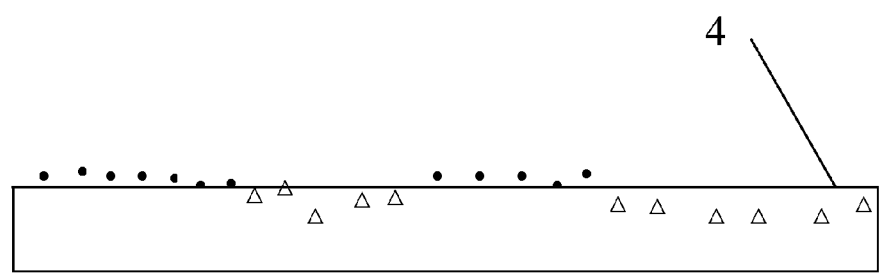
FIG. 3 is a representation of a number of boundary points representative of a measured surface, plotted relative to the nominal surface.

A representation of the results of the data reduction according to the present invention may be represented with the nominal surface 4 as shown in FIG. 3. FIG. 3 is a cross-section of the part 2 taken along section line II of FIG. 2. In FIG. 3, the points represented with a "•" are above the nominal surface 4 and those represented with a "Δ" are below the nominal surface 4. As will be appreciated, a far greater number of measurements were obtained along the surface 2 than the plotted points, but those measurements were ignored during calculation, because they fell between the upper and lower extremes. Only the upper and lower extremes need be considered when making the determination of whether the part is within tolerance, because if the extremes are within tolerance, all points between those extremes also are within tolerance.

Although the determined boundary points may be used to make determinations about whether or not the part is within tolerance, it may also be desirable to further process those points. For example, a surface or a pair of surfaces could be fit to the boundary points. In one embodiment, a convex hull is fit to the boundary points, thereby showing a representative surface of the part, about the boundary points. A first convex hull can be fit to the points above the nominal surface and a second convex hull can be fit to the points below the nominal surface. A three-dimensional space is defined between the two convex hulls and this space encompasses all points on the actual surface.

By comparing the convex hulls to the part tolerances, a determination can be made of whether the part is within tolerance. If any portion of the convex hulls is outside the tolerance limits, the part is not in tolerance and thus is rejected. Because the convex hulls are based on only a subset of all points measured on the surface, this determination of "go" or "no-go", i.e., in- or out-of-tolerance can be done much more quickly, compared to checking every point to determine conformity with the tolerance. But, the convex hulls are as reliable as the actual surface for determining conformity, because they are fit around the "extreme" boundary points. No point on the actual surface will lie outside the convex hull. As will also be appreciated, if one or more convex hulls or other surfaces that are not the actual surface are fit to the boundary points, or are otherwise created to describe the manufactured part, any point on those convex hulls or non-actual surfaces can be obtained, as required, not just the measured points used to create the hulls/surfaces.

In creating the convex hull, depending upon the size of the subset of points considered and the changes in the measured surface, both the "top" convex hull and the "bottom" convex hull could conceivably be above or below the nominal surface if only the boundary points are used. Specifically, if all measured points in a predetermined subset are located above the nominal surface, when the convex hulls are fit to the boundary points in that subset, both will be above the nominal surface, but will be nonetheless accurate, because the actual surface will be between those convex hulls. In an alternative embodiment, it may be desirable to use points on the nominal surface for the boundary point when all points are above or below the nominal surface. In such an embodiment, the space defined between the two convex hulls would always encompass both the actual surface and the nominal surface. In contrast, in the previous embodiment, the space between the convex hulls may not include the nominal surface. As noted above, the convex hulls are used in this embodiment to determine whether the manufactured part is in- or out-of-tolerance. In one embodiment, the hulls can be moved iteratively in a conventional best-fit analysis, to make this determination, but because of the reduced number of points used to define the hulls, the process is much quicker.

In another embodiment of the invention, the number of data points are reduced by representing each of predetermined subsets of data points with a three-dimensional geometric shape that encompasses all measured points. Those shapes can then be combined to create a three-dimensional space that encompasses the surface.

More specifically, for each predetermined subset of points considered, a three-dimensional shape that encompasses all of the measured points is used to represent that subset of points. Using the example of FIG. 2, in which a surface in the X-Y plane is measured to determine its compliance with a flatness requirement, a section of the surface is considered and for that surface a shape is fit that includes all measured points in the section under consideration. Thus, for example, a cube or a parallelepiped, or any other three-dimensional shape having a volume, could be used. The same shape could be used for each considered section of the whole surface, or a shape could be best fit depending upon the section being considered.

In a simple example the measured points for each section under consideration could be reduced to a set number of points, totaling as few as six. Namely, assuming that each point has a position (X, Y, Z) the maximum and minimum measurements in each of the X-, Y- and Z-directions can be obtained from the measurements. Then, a parallelepiped having planar top and bottom surfaces (arranged parallel to the X-Y plane) coincident, respectively, with the maximum and minimum values in the Z-direction and front, back and side planes coincident, respectively, with the minimum X-value, maximum X-value, and minimum and maximum Y-value will encompass all measured points. Of course, if the size of the section of the surface being measured is defined as a known space in the X-Y plane, the front back and sides of the parallelepipeds are known in advance—only the maximum and minimum values in the Z-direction need be obtained to fit the parallelepiped.

In the foregoing example, each parallelepiped can be defined using eight points, namely, the corners of the shape. Thus, eight points take the place of a much-larger number of measured points. Since all of those measured points are contained within the parallelepiped, only the eight points are necessary.

In the method of the embodiment, the original data cloud is generally measured in the part coordinate system such that the data cloud is sufficiently aligned to start the evaluation. However, if the data cloud is measured in an arbitrary coordinate system, and a CAD model is available, then a preliminary alignment may be necessary. In either instance, based on the normal vectors extracted from the measured points, or from the CAD model when the data cloud is already aligned with it, the data cloud is subdivided into uniform or non-uniform volumes. A possible realization of this segmentation process is the "Octree Segmentation Method" described by Wang et al. in *Lidar Data Sementation and Classification based on Octree Structure*. Other known segmentation or rendering processes may be used alternatively.

In a similar embodiment, the data cloud is sub-divided into predetermined subsets or volumes. Each subset or volume contains a number of points, and each point includes a normal vector that identifies the direction normal to the surface being measured. In each volume, the average of the normal vectors of the contained points is calculated. Perpendicular to this average normal vector, top and bottom boundary surfaces are created to enclose all data points of the volume. Thus, the volumes are enclosed by the boundary surfaces. In one embodiment, the top and bottom boundary surfaces can be sides of a box which enclose all points of that volume. In another embodiment, the top and bottom boundary surfaces can be more complicated shapes, such as three-dimensional convex hulls. In either instance, all of the points in the volume are included within the boundary surface. Conceptually, the top and bottom surfaces are "squeezing" the points within the volume from both directions. Sidewalls of the volumes also are provided to separate the volumes from neighboring volumes. To reduce the number of points for future calculations and tolerance comparisons, all of the points in each volume are substituted by only several extreme points which describe the upper and lower boundaries in the volume. As just described, these extreme points are boundaries in a direction perpendicular to the normal vector for each subset or volume, in a direction of the tolerance zone relative to a nominal surface.

When a three-dimensional cube or parallelepiped is used for each volume, the eight corners points of that shape should be used for substitution. Similarly, if a convex hull is used, the points of that hull should be used for substitution.

If the volume is so small that the number of the original data points in the volume is smaller than the number of points required to describe the extreme, then the original points should be kept.

The extreme points used for substitution for the points in each volume are the points that would determine the solution of the Chebyshev zone best-fit to the tolerance zone regardless of whether all of the data points are used or only the extreme points are used. Thus, there is no difference in the evaluation outcome with or without data reduction, but because of the data reduction, analysis of the manufactured part is done more quickly and it is more quickly, yet effectively, determined whether the parts are acceptable.

The foregoing methods are useful for determining part conformity with tolerances. However, the inventors realize that there may be rare practical situations in which the small details of the CAD model are not in good overlap with the actual measured surfaces. This situation can be detected by comparing the CAD model normal vectors at the projected extreme points to the "expected" normal vectors calculated for those points to begin with. If there is a large discrepancy, all the original data points which were in the same volume as the extreme point could be used for the tolerance evaluation.

Thus, according to the invention, the number of measured points is reduced to a subset of points that accurately represent the measured points. Because the subset of points is much smaller, but contains all the information regarding the extreme deviations from the nominal surface, determinations about whether the measured part is in tolerance are more quickly, yet still correctly, obtained. The invention is particularly useful in reducing the time required to perform complex analysis required to determine whether a surface is in- or out-of-tolerance.

While a goal of the invention is generally stated as determining a reduced set of data points to more quickly confirm whether a part should be accepted or rejected, the information about acceptance or rejection also can be graphically shown to the user. Specifically, a Yes or No determination can be given via a graphical user interface or other display screen. Using known CAD programs, a graphical representation can also be made of both the nominal part description and the manufactured part, to show explicitly where the part is out-of-tolerance when a determination has been made that the manufactured part is out-of-tolerance. In this manner, a quality control expert or other user may be able to readily determine that slight alterations or updates to the manufacturing processes can bring future parts into conformity and/or fix already-manufactured parts.

The foregoing embodiments of the present invention are provided as exemplary embodiments and are presently best modes for carrying out the invention. Modifications of these embodiments will be readily apparent to those of ordinary skill in the art. The invention is not intended to be limited by the foregoing embodiments, but instead is intended to be limited only by the appended claims.

The invention claimed is:

1. A method for determining whether a part satisfies a tolerance criterion comprising the steps of:
   making a multiplicity of measurements of the part using a non-contact apparatus, each measurement defining a measured point on the part;
   reducing the number of measured points to a number of boundary points, each boundary point being, relative to surrounding points, farthest from nominal in a direction perpendicular to a tolerance zone, wherein the boundary points that define a boundary within which all measured points are encompassed; and
   comparing the boundary to a tolerance limit of a nominal surface to determine whether the part conforms to the tolerance.

2. The method of claim 1, wherein the reducing step comprises grouping the measured points into a plurality of sets of spatially contiguous measured point subsets and reducing the number of measured points in each measured point subset to a reduced subset.

3. The method of claim 2, further comprising, for each measured point subset, creating a top and a bottom boundary surface nominally parallel to the surface defining the tolerance limit, the top and bottom boundary surfaces enclosing all the measured points in the reduced subset.

4. The method of claim 3, further comprising for each reduced subset, creating side walls perpendicular to the surface defining the tolerance limit that enclose all the measurements in the set.

5. The method of claim 2 wherein each reduced subset is represented by a three-dimensional shape that encompasses all points in the corresponding measured point subset.

6. The method of claim 5, wherein the three-dimensional shape associated with the reduced subsets are stitched together to form a surface defining the part.

7. The method of claim 6 in which the comparing step comprises comparing the coordinates of the corners of the rectilinear boxes to the normal surface defining the tolerance limit.

8. The method of claim 5, wherein each three-dimensional shape is a rectilinear box.

9. The method of claim 1 further comprising filtering the multiplicity of measurements.

10. The method of claim 9 wherein said filtering comprises noise filtering and outlier removal.

11. The method of claim 1 further comprising performing a best-fit analysis on using the reduced number of data points.

12. The method of claim 1, further comprising fitting at least one convex hull to the boundary points.

13. The method of claim 12, comprising fitting two convex hulls to the boundary points to define a space within which all measured points are contained.

14. The method of claim 1, further comprising displaying the results of the determination of whether the part conforms to the tolerance.

15. The method of claim 14, wherein the displaying step comprises displaying a representation of the manufactured part and a representation of the nominal surface of the part.

16. The method of claim 15, wherein the representation of the manufactured part comprises a display of one of at least one of the boundary points and a surface defined by the boundary points.

* * * * *